Nov. 9, 1926.  
J. F. McKAMEY  
SILL COCK  
Filed Feb. 11, 1926
1,606,478
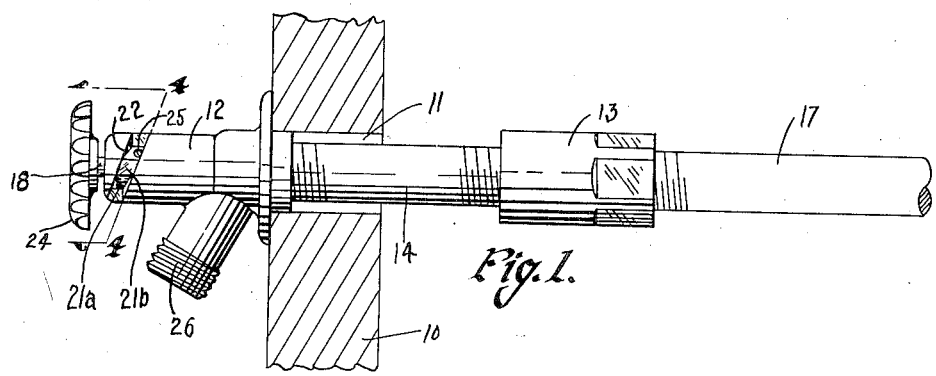
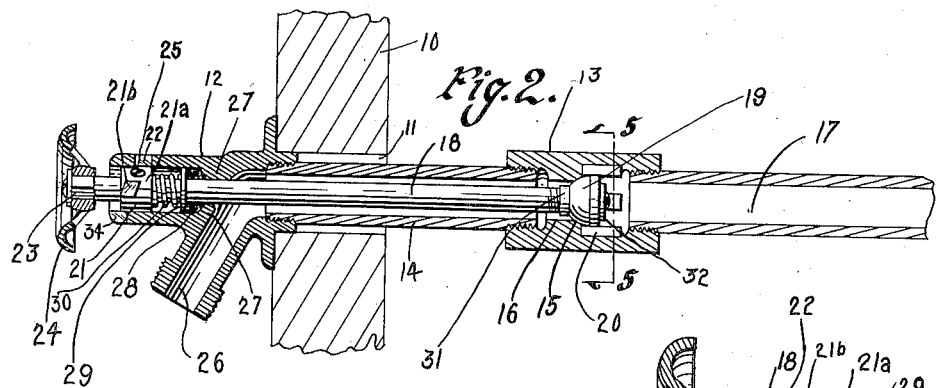
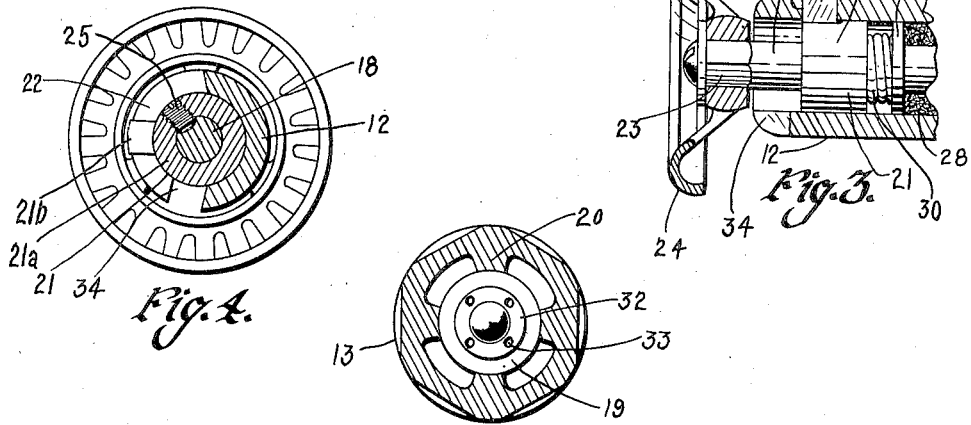
Witness  
L. F. Sandberg
Inventor  
John F. McKamey  
by Bair & Freeman Attorneys Patented Nov. 9, 1926.

1,606,478

UNITED STATES PATENT OFFICE.

JOHN F. McKAMEY, OF OSKALOOSA, IOWA.

SILL COCK.

Application filed February 11, 1926. Serial No. 87,511.

The object of my invention is to provide a sill cock of simple, durable and comparatively inexpensive construction.

More particularly my invention is to provide a sill cock having a valve portion thereon a substantial distance from the operating hand wheel whereby it will be in a position to prevent freezing.

Still a further object is to provide such a device in which the packing is so arranged that the farther the valve is opened the tighter the packing becomes.

With these and other objects in view, my invention consists in the construction, arrangement and combination of the various parts of my invention, whereby the objects contemplated are attained, as hereinafter more fully set forth, pointed out in my claims, and illustrated in the accompanying drawings, in which:

Figure 1, is a side elevation of my improved sill cock showing it installed in the wall of the building.

Figure 2, is a similar view to Figure 1, except that it is in section.

Figure 3, is an enlarged view of the packing end of the sill cock showing the parts in a different position from those shown in Figure 2.

Figure 4, is a sectional view on line 4—4 of Figure 1 and

Figure 5, is a sectional view on line 5—5 of Figure 3.

In the accompanying drawings I have used the reference numeral 10 to indicate a wall or the like of a building.

An opening 11 is formed therein through which the sill cock may be installed.

The sill cock consists of a body portion 12, a valve seat portion 13 and a pipe 14 connecting the two portions just named.

In the valve seat portion is formed an annular seat 15 adjacent the smallest bore 16 of the valve seat portion 13.

The water service pipe 17 is threaded into the valve seat portion 13 at one end thereof and the valve seat portion 13 is screwed onto the pipe 14.

A valve stem 18 passes through the pipe 14 and has a valve plug 19 secured thereto which is designed to coact with the valve seat 15.

Guides 20 are provided for the valve plug 19. On the other end of the valve stem 18 is a cam consisting of a collar like portion 21ª and a pin 21ᵇ. In the body portion 12 is a cam groove 22. The pin 21ᵇ on the cam 21 coacts with the cam groove 22.

On the squared end 23 of the stem an operating wheel 24 is mounted. Thus it will be seen that when the parts are in the position shown in Figures 1 and 2, the valve plug 19 is seated against the valve seat 15.

By rotating the wheel 24 in the counterclockwise direction so that it will assume the position shown in Figure 3, the valve is opened.

This is due to the fact that the pin 21ᵇ traveling in the groove 22 moves the valve stem 18 in a right hand direction in Figure 2.

A set screw 25 is employed to secure the cam 21 to the valve stem 18.

A threaded extension 26 is provided on the body portion 12 to which a hose connection may be made.

When the valve is open, water from the pipe 17 passes the valve plug 19 through the pipe 14 and out through the extension 26.

To prevent water passing the cam 21, I provide a reduced portion 27 in the body portion 12.

A packing 28 encircles the valve stem 18 and is positioned against the reduced portion 27.

A washer 29 is positioned back of the packing 28. A spring 30 encircles the valve stem 18 and is interposed between the collar 21ª and washer 29.

When the valve is closed as shown in Figure 2, the spring 30 exerts a pressure against the washer 29 to compress the packing 28.

When the valve is opened the valve spring 30 is partially or wholly compressed as shown in Figure 3, thus exerting an increased pressure on the packing 28 to prevent leakage of water when the valve is opened.

This arrangement is an advantage because of the fact that a better packing is needed the farther the valve is opened because of the higher water pressure in the sill cock. The valve plug 19 may be formed of rubber or any suitable composition and may be secured to the valve stem 18 in any suitable manner. I have shown this valve plug 19 between a threaded collar 31 and a second threaded collar 32.

The collar 32 may be provided with openings 33 so that a spanner wrench may be employed for tightening or removing the collar.

At the lower end of the cam groove 22 a groove 34 is formed longitudinally of the body portion 12. This is for the purpose of removing the cam 21 by removing the set screw 25 and then rotating the pin 21ᵇ until it registers with the groove 34.

The cam 21 can then be slid out of the body portion 12.

It will thus be seen that I have provided a valve which obviates the necessity of a second valve within the house as is generally the case in installations of this kind.

In the ordinary valve the water comes through the wall of the building to the valve plug which is on the outside of the building.

In cold weather it therefore freezes up and the second valve must be provided within the house for draining that portion of the pipe between the sill cock and the inside valve.

By placing the valve plug on the end of a long stem as I have illustrated, the necessity for shutting off the water in the winter and of having a second valve is obvious.

Another desirable feature which I have attained by the construction illustrated, is an increase pressure on the packing when the valve is opened.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. A sill cock comprising a body portion and a valve seat portion connected by a pipe, a valve in said valve seat portion, a stem connected thereto and extending through said pipe and said body portion, packing means and valve operating means in said body portion, said operating means comprising a collar having a pin extending therefrom, a set screw in said collar for securing it to said stem, a spiral slot in said body portion opening to the interior and the exterior thereof, whereby access may be had through said slot to adjust said set screw said pin being adapted to travel in said slot when the stem is rotated.

2. A sill cock comprising a body portion and a valve seat portion connected by a pipe, a valve in said valve seat portion, guiding means for said valve comprising ribs spaced radially around said valve seat portion and projecting inwardly from the interior wall thereof whereby the space between said ribs provides for the flow of water past the valve, a stem connected thereto and extending through said pipe and said body portion, packing means and valve operating means in said body portion, said operating means comprising a collar having a pin extending therefrom, a set screw in said collar for securing it to said stem, a spiral slot in said body portion opening to the interior and the exterior thereof, whereby access may be had through said slot to adjust said set screw, said pin being adapted to travel in said slot when the stem is rotated.

JOHN F. McKAMEY.